United States Patent [19]
Andressen

[11] Patent Number: 5,870,181
[45] Date of Patent: Feb. 9, 1999

[54] ACOUSTIC OPTICAL SCANNING OF LINEAR DETECTOR ARRAY FOR LASER RADAR

[75] Inventor: Clarence C. Andressen, Clearwater, Fla.

[73] Assignee: Alliant Defense Electronics Systems, Inc., Clearwater, Fla.

[21] Appl. No.: 958,956

[22] Filed: Oct. 28, 1997

[51] Int. Cl.[6] .............................. G01C 3/08; G01B 11/26; G02F 1/33
[52] U.S. Cl. ....................... 356/4.01; 356/141.1; 359/305
[58] Field of Search ......................... 359/305; 356/141.1, 356/4.01

[56] References Cited

U.S. PATENT DOCUMENTS

| | | |
|---|---|---|
| 3,935,566 | 1/1976 | Snopko . |
| 4,419,676 | 12/1983 | Lenk et al. . |
| 5,196,900 | 3/1993 | Pettersen . |
| 5,394,262 | 2/1995 | Anderson ................................ 359/196 |
| 5,416,616 | 5/1995 | Jenkins et al. ............................ 359/11 |

Primary Examiner—Stephen C. Buczinski
Attorney, Agent, or Firm—Stein, Schifino & Van Der Wall

[57] ABSTRACT

A laser radar (LADAR) including an acoustic-optical (AO) laser scanner for deflecting a pulsed laser beam through a plurality of angles, means for diffracting the deflected laser beam from the acoustic-optical laser scanner into a plurality of laser beams and a linear detector array including a plurality of detector elements respectively positioned to receive reflected energy from the respective plurality of laser beams such that a line scan is produced composed of a plurality of pixels.

13 Claims, 2 Drawing Sheets

ACOUSTIC OPTICAL SCANNING OF LINEAR DETECTOR ARRAY FOR LASER RADAR

BACKGROUND OF THE INVENTION

1. Field of the Invention

This invention relates to active electro-optical imaging systems for searching object space. More particularly, this invention relates to imaging systems that require high pixel rates and programmable scan rates.

2. Description of the Background Art

Presently, there exist many types of imaging systems for searching object space for potential targets and for providing target position information to a sensor system to initiate and guide projectiles and/or missiles to the selected target. Such target position information may also be provided to a visual display device allowing visual review of the selected target for visual identification and prioritization of the selected target(s).

Militarily, there exists a need for a very precise imaging system that can detect and identify enemy targets with great precision. Current laser technology, coupled with state-of-the-art optics, can provide narrow beams that can be accurately placed to determine very precise target characteristics for detection and identification as well as precise target location compared to other deployed sensor systems. However, the very small beam size imposes significant limitations in data and scan rate requirements to cover a required field of view (FOV). Therefore, a laser radar (Ladar) applied to missile systems requires high pixel rates and programmable scan rates. Typical prior art systems employ the use of a rotating polygon scanner at high angular rates. In such scanners, mechanical systems are used to generate the angular steps that must be coupled to the pulse repetition frequency of the system. Unfortunately, such mechanical implementation reduces reliability, is inflexible and requires significant volume.

Therefore, it is an object of this invention to provide an improvement which overcomes the aforementioned inadequacies of the prior art devices and provides an improvement which is a significant contribution to the advancement of the Ladar art.

Another object of the invention is to provide a scanner comprising an acoustic-optical laser scanner for deflecting a pulsed laser beam through a plurality of angles; means for diffracting the deflected laser beam from the acoustic-optical laser scanner into a plurality of laser beams; and a detector array including a plurality of detector elements respectively positioned to receive reflected energy from the respective plurality of laser beams, whereby a line scan is produced composed of a plurality of pixels.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a unique combination of an acoustic-optical (AO) laser scanner and a linear detector array in a laser radar (LADAR) that eliminates the need for rotating fixed angle scanners or a second axis motorized scanner mirror that normally limits flexibility and scan speed. The AO scanner and linear detector array combination of the Ladar of the invention provides adaptable scan rates and high scan speed at a low cost while achieving high performance.

Notably, the employment of the AO scanner in the Ladar of the invention allows for rapid beam scanning in one dimension whereas in the other dimension the laser beam is moved in the conventional sense by a scalable motorized mirror. The AO modulator can switch the beam rapidly in various step sizes allowing for precise and rapid vertical coverage of the scene, due to the rapid (one micro-second) beam switching. Coupled with the multi-element linear staggered detector array, the employment of the AO scanner achieves the capability of high rate FOV coverage with a single axis scan mirror. Significantly increased pixel rates and coverage volume is achieved while utilizing less volume than is currently conventionally found in rotating polygon scanners or the like. Thus, by eliminating rotating and moving parts, reliability is improved. The AO scanner is considerably more precise in beam positioning than prior art rotating polygon scanners or the like. Further, AO scanners are programmable devices that can be adjusted essentially real time for compensation of various affects such as the velocity of a moving platform or vehicle stabilization.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
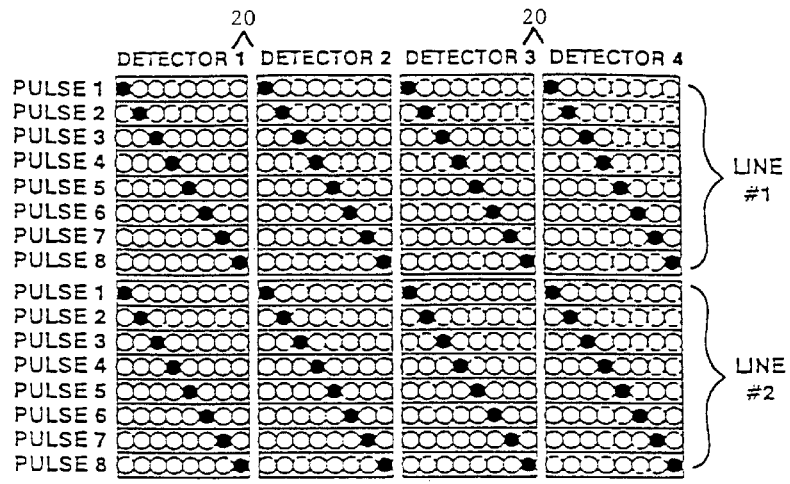
FIG. 1 is a plan view of a exemplary detector array illustrating the manner in which the acoustic-optical scanner is employed within the Ladar of the invention.

Preliminarily, it is noted that for smart sensor applications, the line scan for a Ladar should be on the order of 1000 lines per second. The problem presented is that in scanning any optical sensor, the receive aperture needs to be as large as practical to achieve desired system range;

however, a large receive aperture conflicts with the need to scan at high rates to achieve high frame rates. The solution to the problem of scanning at high rates that is solved by the present invention, is to use a linear detector array to cover an entire line, so that only a low speed, frame scan motion is needed.

More particularly, referring to each of the Figures, the scanner 10 of the invention employs an acoustic-optical (AO) scanner 12 and a diffractive optical element 14 to diffract a laser beam 16 from a laser 18 into multiple beams 16B simultaneously. Each beam 16B and its corresponding detector element 20 cover a portion of the complete line to be scanned. A complete line of data can be obtained without mechanical scanning by arranging multiple linear detector elements 20 end to end.

By way of illustration in connection with FIG. 1, the laser beam 16 is deflected by the AO scanner 12 through the defractive optical element 14 to generate four beams 16B simultaneously. The AO scanner 12 is controlled to deflect the laser beam 16 and the resulting four multiple beams 16B through eight angles over eight successive laser 18 pulses to thereby generate one line of the frame. The image spots from the eight pulses step sequentially along the full length of the detector 20 and then the next eight pulse spots return and repeat the sequential stepping for the next line of frames upon deflection via a vertical scan mirror 22. Thus, it should be seen that each line consists of eight pulses across four detectors thereby equaling thirty-two pixels per line.

Figure 2:
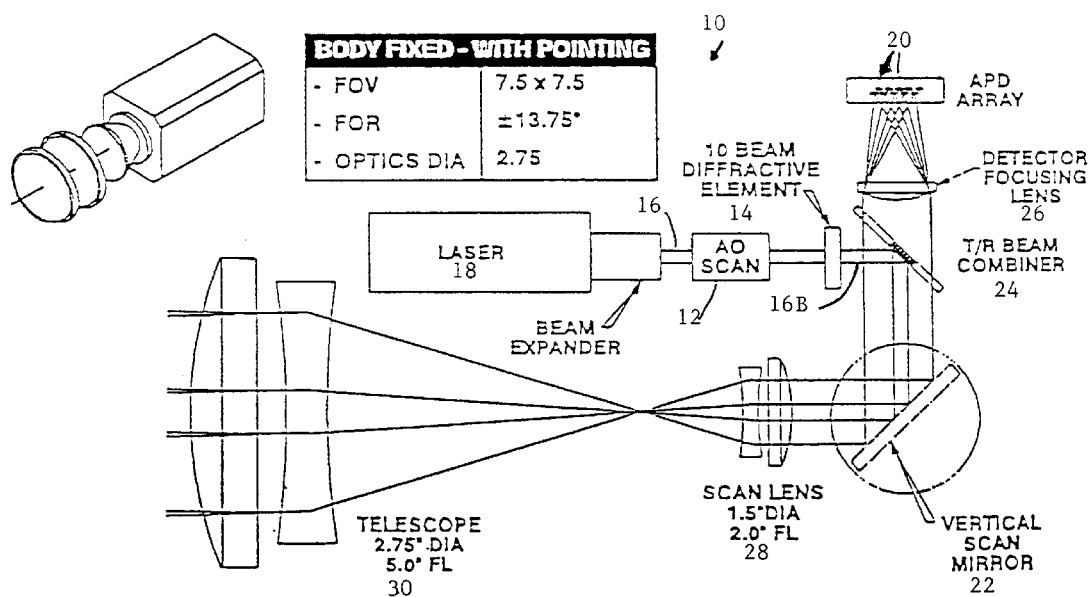
FIG. 2 is a diagrammatic view of the Ladar of the invention.
Figure 3:
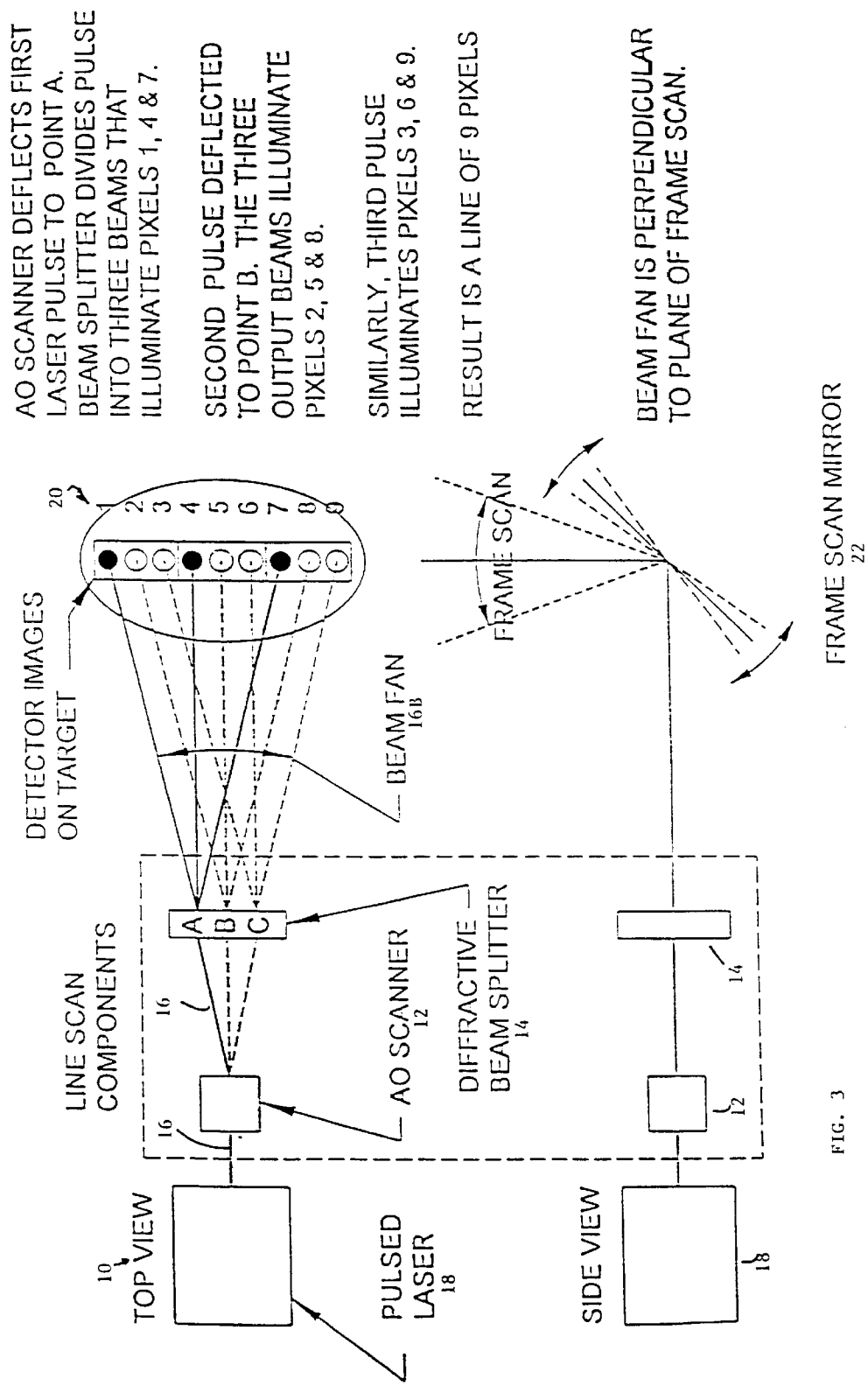
FIG. 3 is a diagrammatic top and side view of the Ladar showing the manner in which a full line of pixels are generated without any mechanical motion.

In FIG. 3, top and side views of the scanner 10 are diagrammatically illustrated showing the beam splitter 14 splitting the beam 16 into three beams 16B, rather than as described above in connection with FIGS. 1 and 2. As noted textually in the drawing, a line of 9 pixels is produced per frame scan 22.

It is noted that AO scanners 12 cannot scan a beam much larger than about 0.25 inches in diameter, but the same is sufficiently large to be used to scan the laser beams 16 along the linear detector elements 20 at high scan rates since the laser beams 16 only need to be a fraction of the size of the receive aperture.

The above-described line scan concept is easily programmable to adapt to different search, identification and track requirements. The response time of the AO scanner 12 is less than 1 micro-second, thereby allowing the laser spot to be placed at any laser location on the linear detector elements 20. Moreover, multiple pulses can be taken at each pixel or the AO scanner can use sparse pixel coverage to search a large area rapidly by generating a pulse at every other pixel location. This flexibility allows high resolution for identification or fast updating for terminal guidance.

Most importantly, it should be appreciated that the scanning method of the invention can be easily expanded to provide even greater line scan rates at substantial pixel resolutions. For example, as shown in connection with FIG. 2, the diffractive optical element 14 may be configured to diffract laser beam 16 into ten multiple beams 16B. The detector array may comprise ten detector elements 20 positioned end to end. The AO scanner 12 may be operated to deflect the laser beam 16 through thirty-two angles over thirty-two successive laser pulses such that each time the laser generates a pulse, ten multiple beams 16B are generated by the diffractive element 14, and exit through beam combiner 24, focusing lens 26, scan lens 28 and telescope 30, thereby generating a pixel. Each detector element 20 measures the return of one of the beams. Each detector element 20, because of its length, can be used to measure thirty-two different pixels along the complete line. Thus, on the first laser pulse, the first detector measures pixel one, the second detector measures pixel thirty-three, the third detector measures pixel sixty-five, and so on. When the next laser pulse is generated, the AO scanner 12 deflects the beam to place the ten multiple beams on the next pixel within each of the detector elements 20 such that the first detector measures pixel two, the second detector measures pixel thirty-four, the third detector measures pixel sixty-six, and so on. Upon completing such procedure, a line of 320 pixels is produced. A slight offset may be used on alternate detector elements to allow for continuous coverage and allow for the necessary separation between detectors to prevent shorting and cross coupling energy.

The Ladar scanner 10 of the invention employing the AO scanner 12 provides a method for rapid beam positioning enabling the FOV coverage required for precise applications. Moreover, a programmable amount of beam steering can be employed for use in varying environments and applications or missions.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A scanner, comprising in combination:

an acoustic-optical laser scanner for deflecting a pulsed laser beam through a plurality of angles;

means for diffracting the deflected laser beam from the acoustic-optical laser scanner into a plurality of laser beams; and a detector array including a plurality of detector elements respectively positioned to receive reflected energy from respective said plurality of laser beams, whereby a line scan is produced composed of a plurality of pixels.

2. The scanner as set forth in claim 1, wherein said deflection of said pulsed laser beam through a plurality of angles by said acoustic-optical laser scanner comprises means for deflecting said pulsed laser beam at a different said angle for different said pulses of said laser beam.

3. The scanner as set forth in claim 2, wherein said deflecting of said pulsed laser beam at different said angles for different said pulses repetitively occurs until said deflection extends across a length of said detector elements to produce the line scan of closely positioned pixels.

4. The scanner as set forth in claim 3, further including a scan mirror for sequentially shifting said received reflected energy from respective said plurality of laser beams so as to produce sequential said line scans.

5. The scanner as set forth in claim 4, wherein alternate said detector elements are slightly offset to allow for continuous coverage and allow for the necessary separation between detectors to prevent shorting and cross coupling energy.

6. The scanner as set forth in claim 4, wherein multiple of said laser pulses are allowed to occur at the same said angle.

7. The scanner as set forth in claim 4, wherein said laser pulses do not occur at all of said angles.

8. A scanning method, comprising the steps of:

deflecting a pulsed laser beam through a plurality of angles;

diffracting the deflected laser beam into a plurality of laser beams;

receiving reflected energy from the respective plurality of laser beams and passing the reflective energy onto respective detector elements, whereby a line scan is produced composed of a plurality of pixels.

9. The scanning method as set forth in claim 8, wherein the step of deflecting the pulsed laser beam through a plurality of angles comprises deflecting the pulsed laser beam at a different angle for different pulses of the laser beam.

10. The scanning method as set forth in claim 9, wherein the step of deflecting the pulsed laser beam at different angles for different pulses repetitively occurs until the deflection extends across a length of the detector elements to produce the line scan of closely positioned pixels.

11. The scanning method as set forth in claim 8, further including the step of sequentially shifting the received reflected energy from respective plurality of laser beams so as to produce sequential line scans.

12. The scanning method as set forth in claim 8, wherein a multiple of the laser pulses occurs at the same angle.

13. The scanning method as set forth in claim 8, wherein the laser pulses do not occur at all of the angles.

* * * * *